United States Patent [19]
Cerni et al.

[11] 3,973,258
[45] Aug. 3, 1976

[54] TRANSIENT EVENT DATA ACQUISITION APPARATUS FOR USE WITH RADAR SYSTEMS AND THE LIKE

[75] Inventors: Todd A. Cerni; Edmund Philip Krider, both of Tucson, Ariz.

[73] Assignee: The United States of America as represented by the Secretary of the Navy, Washington, D.C.

[22] Filed: Jan. 24, 1975

[21] Appl. No.: 543,745

[52] U.S. Cl. .............................. 343/5 W; 343/5 PC; 343/6 R; 343/12 R
[51] Int. Cl.² .......................................... G01S 9/60
[58] Field of Search ................. 343/5 PC, 5 W, 6 R, 343/12 R

[56] References Cited
UNITED STATES PATENTS
3,508,259   4/1970   Andrews ........................ 343/5 W X

*Primary Examiner*—T.H. Tubbesing

[57] ABSTRACT

The apparatus detects in real time the amplitude and range of certain transient events such as lightning discharges, the arrangement being such that a transient event which is capable of producing a return echo signal initially greater than other return signals is detected and the amplitude and range acquired in a manner which permits recording on moderate speed recording devices. A conventional sample and hold circuit acquires the range and its output gates a peak detector into "on" and "off" modes with the "on" period being centered about the range acquired by the sample and hold circuit. The "on" period is of relatively short duration and, importantly, the output acquired during the "on" period is held by the peak detector circuit until the initiation of the next transmitter pulse. The range output of the sample and hold circuit also is held for a predetermined length of time or until another transient event occurs. The 'hold' periods permit the use of moderate speed recording devices. Consequently, amplitude and range are processed in real time and applied to the recorder. A photodiode also is used to view the space illuminated by the radar beam. This optical detection triggers both the peak detector and the sample and hold circuit and, additionally, is applied to the recorder to verify the relationship between the event and the recorded data.

14 Claims, 4 Drawing Figures

TRANSIENT EVENT DATA ACQUISITION APPARATUS FOR USE WITH RADAR SYSTEMS AND THE LIKE

BACKGROUND OF THE INVENTION

The present invention relates to data acquisition systems and, in particular, to systems for processing radar return signals derived from particular transient events, such as lightning discharges.

Although the apparatus is primarily intended for the detection and analysis of transient echoes from lightning strokes other applications are recognized. For example, with some minor modifications the apparatus can be adapted for the detection and analysis of related transient events such as explosions, ballistics, etc. However, as will become apparent, a fundamental requirement for effective operation is that the echo or return signal from the target of interest must be initially greater than other return signals from the radar beam. Thus, generally considered, the present invention primarily contemplates applications involving particular, pre-selected echoes having the discriminatory strength characteristics which have just been noted.

Basically, there are two other methods of recording the amplitude and range of radar echoes produced by a transient event. Both, however, involve recording the entire video return signal from the radar receiver over the full length of time during which the transient event of interest might occur. The recorded data then must be subsequently reviewed by going back over the entire record to locate the transient events of interest. Such methods usually employ either magnetic tape, or oscilloscope and streak cameras and, for various reasons, they are quite impractical for high time resolution signals whose time of occurrence is not known precisely in advance. Lightning echoes, of course, are a prime example of such signals. The principle difficulty with these prior systems is that they do not allow an actual data reduction to take place prior to recording and in real time. Further, the required recording speeds for the recorders used are considerably greater and their ability to operate over extended periods of time is limited.

OBJECTS OF THE PRESENT INVENTION

One object of the invention is, therefore, to provide data acquisition apparatus capable of acquiring radar return signal data derived from transient events of the type under consideration and of reducing this data prior to recording and in real time.

Another object is to provide a data acquisition circuit which permits recording of the reduced data on a moderate speed, relatively inexpensive recorder.

Other objects are to provide the apparatus at a relatively low cost and, in particular, to provide apparatus capable of operating over extended periods of time made necessary because of the need to view the sky until occurrence of the particular event.

A further object is to provide apparatus capable of displaying the temporal variation of intensity of very short-duration signals originating from a target at a constant range and within the fixed beam of a radar or lidar.

Another object is to provide a means of verifying that the observed transient radar echoes were, in fact, caused by a particular lightning stroke.

Still another object is to provide apparatus capable of determining the radar cross section of cloud-to-ground lightning and its temporal variations during and between strokes. Such measurements, as is known, are capable of providing the temporal variations of the electrical density of the lightning channel, as well as an estimate of channel radius and possibly the conditions conducive to dart leader formations.

Other objects and their attendant advantages will become more apparent in the ensuing description.

SUMMARY OF THE INVENTION

The present data acquisition apparatus is intended for use with radar or lidar systems which, in the conventional manner, utilize a transmitter driven at a particular pulse repetition rate to produce a series of return signals from targets illuminated by each transmitted pulse. The apparatus acquires and processes in real time data obtained from certain transient event targets which, more specifically, are preselected targets capable of producing return signals initially greater than other return signals derived from each radar transmitter pulse. In general, the apparatus includes a transient event detector generating an output signal to mark the occurrence of each of the preselected transient events. Concurrently, a resettably-gated peak detector trackably acquires the peak value present in each of the video return signals from each transmitter pulse. Further, this peak detector holds the acquired peak value for a particular period of time which, preferably, is a period extending until the transmission of the next radar pulse. A sample and hold circuit is triggered by the transient event detector output to produce an output signal representing the range of the transient event and also to hold this output signal for a predetermined period of time or, alternatively, until receipt of another transient event output signal. Peak detector control means are coupled to the output of the sample and hold circuit to gate the peak detector into a special "on" and "off" modes with the "on" mode centered about the range of the transient event. The "on" mode has a short duration period relative to the transmitter pulse repetition rate and, as will be appreciated, the peak detector then functions to sample and acquire its amplitude data only during the "on" period. Since the 'hold' periods of both the peak detector and the sample and hold circuit are relatively long the apparatus can employ a moderate speed recorder to display its processed data.

BRIEF DESCRIPTION OF THE DRAWINGS

The present invention is illustrated in the accompanying drawings of which.

DETAILED DESCRIPTION OF THE INVENTION

Figure 1:
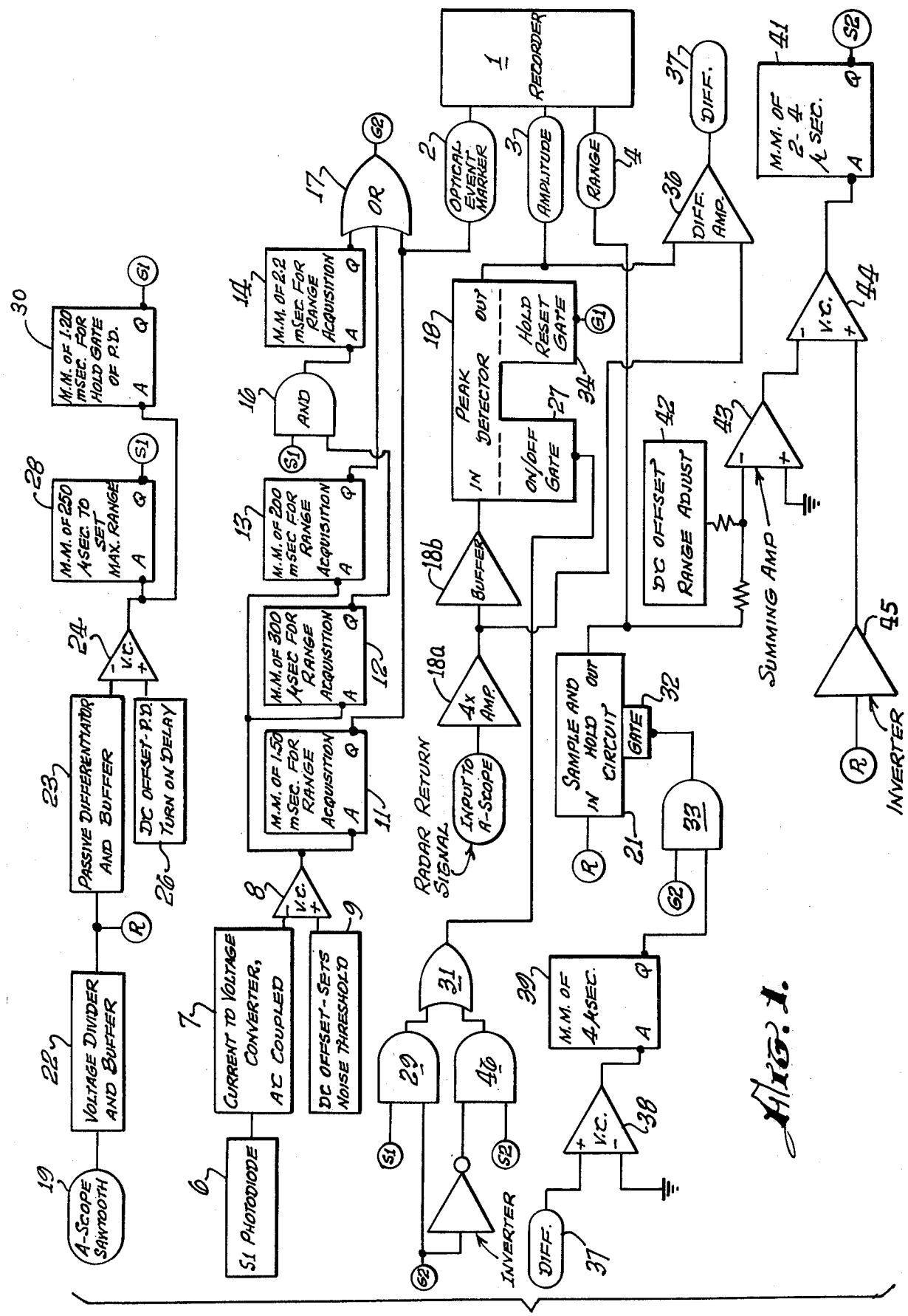
FIG. 1 is a block diagram illustrating the present data acquisition apparatus.

Before considering the illustrated system, it should be noted that this particular system evolved from an experiment which was designed to determine the radar cross-section of cloud-to-ground lightning and its temporal variations during and between strokes.

Regarding this experiment, it was obvious at the outset that any successful results would at a minimum require a system capable of unambiguously separating or discriminating in both range and azimuth the radar lightning echoes from background noises such as, in particular, precipitation echoes. For this reason, the experimental design was based upon what appeared to be reliable calculations published by a previous investigator which showed that at 10 centimeters the radar echo from cloud-to-ground lightning strokes could be expected initially to be several orders of magnitude greater than the precipitation echoes. Consequently, the experimental radar employed an NCAR CPR- 1 pulsed radar of 10.7 $\mu$S wavelength having a peak power of 500kW, a 750 PPS repetition rate, a 1 ms pulse width and a minimum detectable signal (mds) strength of −104 dBm. The antenna was a so-called "banana peel" antenna mounted vertically to provide a vertical beam width of 2° and a horizontal beam width of 8°. Consequently, a reasonably narrow vertical section of cloud-to-ground lightning channel could be isolated, while the horizontal field of view was sufficient to allow a reasonable probability of detecting lightning. This radar also was equipped in a conventional manner with both linear and logarithmic (6 decades of returned power) IF, the latter greatly facilitating data acquisition. Since a single stroke lightning flash usually lasts less than 0.1 seconds and since the radar antenna typically takes many seconds to scan 360° in azimuth, the experiment was conducted with the antenna stationary and pointed toward a suspected thunderstorm to maximize the probability of detecting lightning.

The data acquisition system to be described is the one evolved for use in the experiment with the 10.7cm radar functioning in the manner which has been outlined. However, as will become apparent, this particular radar design is not presently considered as being the preferred design for the detection of radar lightning echoes. Instead, as will be shown, the experimental results seem to establish the need for radars of longer wavelength, such as radars of about 50cm. Alternatively, radars of lesser wavelength, such as the 10cm, wavelength can be used provided they are circularly polarized or cross polarized to the extent that they transmit linear polarization in one plane and receive in a perpendicular plane on a second antenna. These other types of radar seem to be a far better choice for measuring the radar cross-section of cloud-to-ground lightning channels since they are capable of providing a lightning echo several orders of magnitude larger in amplitude than precipitation echoes. Nevertheless, the 10cm radar for which the illustrated data acquisition system was evolved, clearly exemplifies an operative system capable of achieving the objects of the present invention and, in fact, the 10cm radar can be employed for the lightning echoes as well as other target acquisitions if means are employed to assure that the return echo from the target of interest initially is greater than the return echoes from other reflected signals.

As has been stated the data acquisition apparatus illustrated in FIG. 1 primarily functions to separate lightning echoes from precipitation echoes and to present the amplitude and range of the lightning echoes for recording on a moderate speed recording device. The recorder of the system is identified by numeral 1 and, as shown, it receives three inputs identified as an optical event marker 2, amplitude 3, and range 4. As also shown, optical event marker 2 is an output provided by a silicon photodiode detector 6 after being processed through a current to voltage converter 7 and a voltage comparator 8 in which noise is removed due to a DC offset 9. Multivibrators 11, 12, 13 and 14 which function in a conventional manner provide input signals for logic circuits 16 and 17, logic circuit 16 being an 'AND' circuit and logic circuit 17 being an 'OR' circuit. As will be noted, circuits 16 and 17 of FIG. 1 are drawn in the conventional manner with the same conventional representations being used throughout FIG. 1 for other comparable 'AND' and 'OR' circuits.

One function of the multivibrators is to provide a 'optical event marker' 2 as an input for recorder 1, this input further being identifiable with amplitude and range inputs 3 and 4 to the extent that the recorded amplitude and range can be verified as data directly representing a particular event. Another function of the multivibrators and the logic circuitry is to provide an output identified in FIG. 1 as output G2 which is applied in a manner to be described as a trigger signal for a particular gate of a peak detector 18. The output G2 and the manner which it controls peak detector 18 will be considered subsequently. In general, however, the multivibrators and the logic circuits used with photodiode 6 as well as other similar circuits of FIG. 1 are intended to function in conventional manners to produce the desired results which will become apparent. Obviously, other comparable devices can be substituted.

In addition to peak detector 18 which has been identified and silicon photodiode 6 which produces marker 2 as well as output G2, the data acquisition circuitry of FIG. 1 generally includes two other major components identified in FIG. 1 as an A-scope sawtooth generator 19 and a sample and hold circuit 21. Sawtooth generator 19 is a conventional radar A-scope capable of producing an A-scope sweep triggered upon the emission of each radar pulse. As is well known, such an A-scope produces a series of sawtooth waveforms each of which provides a ramp having a time duration synchronized with the emission of each transmitter pulse so that each ramp has a time-duration representing the maximum range of return-signal interest. Further, since any point on the sawtooth or ramp waveform is time related to the emission of the radar pulses, any particular voltage level on the sawtooth corresponds to a particular range.

The sawtooth of A-scope 19 is processed as shown in FIG. 1 first by applying it to a voltage divider and buffer component 22 to adjust the voltage to a level enabling its use in the logic circuitry. In particular, it is to be noted that the output from voltage divider 22 which, in effect, is the generated sawtooth of A-scope 19, is taken as an output identified as output R which, for purposes that will become apparent, is applied as an input to sample and hold circuit 21. Further, the A-scope output is applied through a passive differentiator and buffer 23 to a voltage comparator 24 which compares the differentiator input with a DC offset 26. The output of voltage comparator, in turn, is applied to multivibrators 28 and 30 to produce a pair of monostable multivibrator outputs identified as S1 and G1, S1 being timed to represent the maximum range of return-signal interest and G1 being applied to peak detector 18.

The principle components are peak detector 18 and sample and hold circuit 21 which, as will be described, interact in a particular manner to provide real-time processing of the video return signals capable of producing the amplitude and range data for moderate speed recorder device 1. Peak detector 18 as well as sample and hold circuit 21 best can be understood by considering their specific operations.

Detector 18 is a high speed peak detector receiving the video radar returns which first, as shown are successively amplified and buffered in components 18a and 18b. Routinely, this detector resets to 0 just before the emission of each radar transmitter pulse. In other words, it is routinely gated 'on' for a particular period of time following the transmission of each radar pulse. Its function is to obtain the amplitude of the largest return echo derived from that pulse. In the particular implementation shown in FIG. 1 which, as has been explained, represents a particular experimental implementation, the peak detector is gated on for the first 250 ms which represents a range of about 25 miles. This control of peak detector 18 is derived from a peak detector on/off gate 27 which, in turn, is triggered by output S1 produced by monostable multivibrator 28 of the A-scope sawtooth. Output S1 is applied to gate 27 through logic circuitry including an 'AND' gate 29 and an 'OR' gate 31.

It will be noted that the foregoing description of the peak detector relates primarily to what has been termed the routine operation of the detector or, in other words, to the normal functioning of the detector in the absence, for example, of a lightning echo return. Consequently, when applied to lightning detection the peak detector, routinely obtains the amplitude of the largest precipitation echo. Concurrently, sample and hold circuit 21 routinely is tracking output R of A-scope sawtooth 19 and acquiring that voltage of the A-scope's sawtooth which corresponds to the range of the largest amplitude return echo. This range then is held for a fixed period of time which, in the illustrated implementation, is 200 msec or until an optical lightning event occurs. As will be apparent, the significant operations of the present circuitry take place upon the occurrence of a lightning stroke or other target of interest so that the so-called routine operations in the absence of return echoes of interest are of little relative concern. It can be noted nevertheless that the hold gate for the sample and hold circuit is controlled by monostable multivibrator component 13 which previously has been identified. In particular, this monostable multivibrator produces a hold output for the desired 200 ms time period. Sample and hold circuit or module 21 is simply a device to track an input signal, such as signal R and to hold upon command, an instantaneous input value, the command being provided by a logic control signal which, in the present circuit, is derived through gate 32 and logic component 33. If desired, further identification or description of such sample and hold modules can be provided by reference to a text "Operational Amplifiers-Design and Application" published in 1971 by McGraw-Hill and edited by Messrs. Tohey, Graeme and Huelsman. In particular, the circuit shown on page 353 of this publication and described in the publication is suitable for the present data acquisition circuitry. In implementing of this particular circuit, the present purposes best are served by employing moderately wide band, FET input, hybrid operational amplifiers, SN 72741'S can be used in all non-critical applications. Further, all the monostable multivibrators and the digital logic can be standard 7400 series TTL. The voltage comparators can be provided by SN 72710'S.

When a lightning discharge or other target of interest is optically detected, sample and hold circuit 21 acquires the voltage of the A-scope sawtooth which corresponds to the range of the largest amplitude radar return signal from the first radar pulse following the optical event and this range is held for 200 ms or, again, until the next optical lightning event occurs. The range of the largest amplitude return echo then is the range of the lightning event.

Sample and hold circuit also produces a logic control signal identified in FIG. 1 as signal S2 and this signal is employed to gate peak detector 18 into an "on" mode for a relatively short period of time which, for example, may be a period of 2-4 microseconds. Further, this "on" period for the peak detector is centered about the range stored or held by sample and hold circuit 21. As a result, peak detector 18 samples the radar return signals only during the "on" period which, again, is a period centered about the range of the lightning event. As a result, its output, identified in FIG. 1 as amplitude 3, provides data pertinent only to the particular lightning event which has been optically detected. Further, as should be apparent, the data will continue to be provided as the return echo decays. More specifically, it continues until such time as the return echo decays to the noise level of the precipitation echoes at the precise range of the event.

Another important aspect is that amplitude output 3 of peak detector 18 also is held for a preset period of time which, in the present instance, is synchronized with the radar transmitter to the extent that the whole period extends from the time of detection until the emission of the next radar pulse. This period of time is controlled by a hold reset gate 34 which itself is controlled by previously-mentioned output G1. Because of these hold periods, a recording device of only about 1 kHZ bandwidth is required. More generally, the requirement for the recording device is that it have a bandwidth which is approximately equal to 1/radar PRF. In summary then, a feature of the arrangement is that, beginning with the second or third radar pulse following an optical lightning event, the peak detector is gated "on" only for a few microseconds centered about the range of the largest echo detected on the preceding radar pulse. The shortness of the 'range gate' stems from the belief that a cloud-to-ground channel should produce only about a 1 $\mu$S wide pulse. Thus, the arrangement enables the recording of the amplitude of the lightning echo until that amplitude falls below the amplitude of the precipitation echo at the exact range of the lightning channel. At such a time, the lightning echo would be indiscernible on any sort of radar display.

The manner in which these functions are implemented involves a special feedback-type of interaction between peak detector 18 and sample and hold circuit 21. First, as will be noted in FIG. 1, the peak detector circuitry includes a differential amplifier 36 used to provide the differential voltage between the amplified input to the peak detector and the peak detector output. Consequently, the largest amplitude return signal as detected by peak detector 18 can be applied as a differential voltage to control sample and hold circuit 21 and, since sample and hold circuit 21 is tracking input R of the A-scope sawtooth, it will function to acquire the proper range of the largest amplitude return signal and to hold this range for the fixed period of time or until the next lightning event. Obviously, when a lightning event occurs, the sample and hold circuit acquires the proper range of the lightning event. To achieve this purpose, output 37 of the differential amplifier is applied through a voltage comparator 38 and a 4 microsecond monostable multivibrator to previously-mentioned "AND" gate 33 to produce the control logic for sample and hold gate 32.

The output of sample and hold circuit 21 also is used to produce a control signal identified as signal S2 which, importantly, when combined with the optical detector output G2 functions to cause the peak detector to be gated into its relatively narrow range gate "on" mode. As implemented, the narrow range gate of 2–4 microseconds represent about 1000–2000 feet in range. The time duration for the narrow 2–4 microsecond "on" period of the peak detector is controlled by a monostable vibrator 41. First, however, the output is processed through a DC offset-range adjust mechanism 42 to compensate for minor errors in the range data obtained by the sample and hold circuit and through a summing amplifier 43 the output of which is compared with an inverted sawtooth output R in a voltage comparator 44 the inversion being achieved by components 45.

Peak detector 18 as has been noted, routinely is under the control of output S1 of multivibrator 28 causing the peak detector to sample or track the entire radar signal input being received. Upon the occurrence of the lightning stroke, output G2 of the silicon photodiode is applied to "AND" circuit 29 and in an inverted form to "AND" circuit 46 which combines with multivibrator output S2 to produce the signals needed to gate the peak detector into a "OFF" for all ranges except the desired narrow 2–4 microsecond range. As stated, a range window thus is provided which is centered about the range at which the lightning stroke is known to have occurred due to the fact that the range of the stroke is detected as the held level of the sample and hold circuit. Further, although the peak detector is tracking only during its "on" mode it nevertheless holds its detected amplitude for the period determined by hold reset gate G1. Since the output of the sample and hold circuit also is held, both amplitude and range can be recorded on the moderate speed recorder. The fact that optical event marker 2 also is being recorded provides a verification of the fact that the amplitude and range data represent a particular optical event.

A further feature which already has been mentioned is the fact that the gating control for the peak detector begins with the second or third radar pulse following the appearance of the lightning stroke. In other words, although the lightning stroke first is detected by the optical detector during an initial radar pulse, the peak detector "ON" and "OFF" modes are initiated in a timed sequence with a radar pulse occurring subsequent to the initial pulse. This delay is achieved since the "ON" and "OFF" gating is controlled by output G2 of the optical detector.

Figure 3:
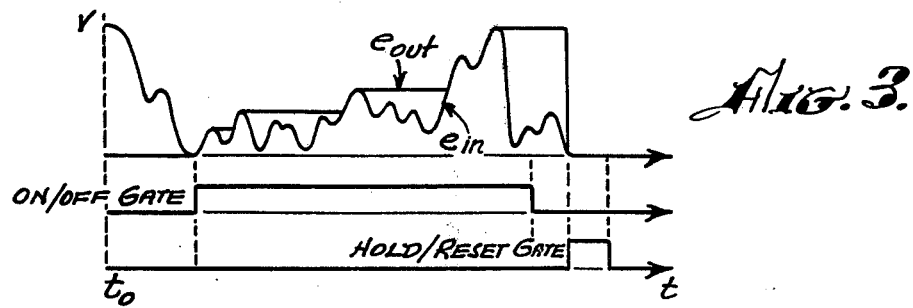
FIGS. 3 and 4 are voltage waveforms for the gated peak detector of FIG. 2; the FIG. 3 waveform being derived from the so-called ungated mode of the detector and the waveform of FIG. 4 being derived from the gated mode.
Figure 4:
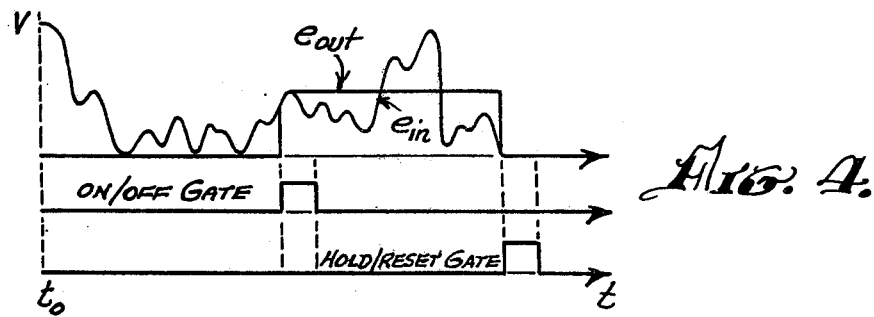

The operation of peak detector and its associated circuitry is perhaps more clearly recognizable by a consideration of the voltage waveforms of FIGS. 3 and 4. FIG. 3 shows a voltage waveform for the gated peak detector operating in the so-called ungated mode which also has been identified as the routine or normal operation occurring in the absence of any target of interest. As shown, the peak detector is sampling the entire series of return signals from a single transmitter pulse and it is constantly acquiring and holding the highest level signal present in this series. Its recycling is controlled by output S1 and its hold and reset by output G1. FIG. 4 shows the voltage waveform derived in the gated mode operation of the peak detector. As will be noted, the detector then is gated "ON" only for the relatively short window period centered about the range of the highest peak detected in FIG. 3. In this instance, the peak detector output is held for a period approximating the time between radar pulses since, as shown, the peak detector is gated "OFF" prior to the time it reaches its $e_{in}$ level so that subsequent high peaks are not acquired.

Figure 2:
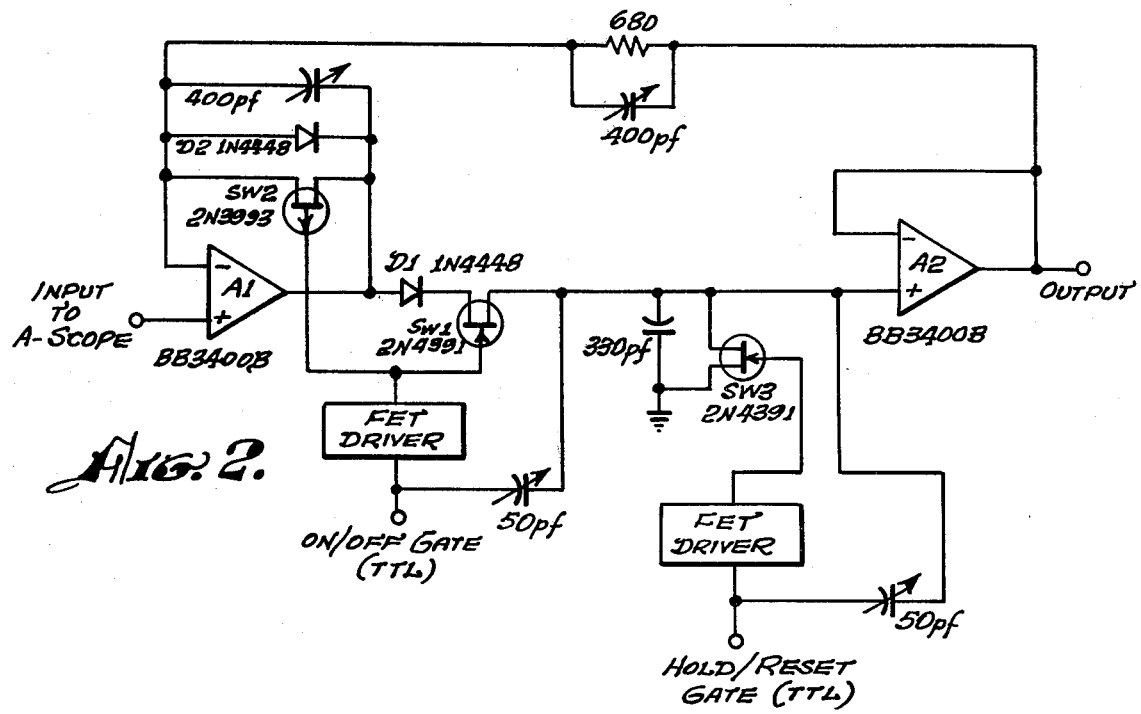
FIG. 2 is a circuit diagram of the gated peak detector used in the apparatus.

Although peak detector 18 and its associated circuitry can be implemented in a variety of manners, the circuitry of FIG. 2 has been found to be especially suitable for present purposes. Referring to FIG. 2, the illustrated circuitry employs two wideband, fast settling, FET input, hybrid operational amplifiers A1 and A2. Preferably, a settling time of 0.2 $\mu S$ is used for peak detection of radar returns from a radar set such as that used in the present experiment or, in other words, of a radar set of 1.0 $\mu S$ pulse width. This requirement is significant because a peak detector circuit either must be critically damped or overdamped due to the fact that any overshoot will be held as the peak value. The circuit also employs a small size holding capacitor of 330 pf required so that the settling time of amplifier A1 will not be degraded by large loading capacitance. Still faster settling amplifiers would be desirable for a radar set of a pulse width much less than 1 $\mu S$. Diode D1 is placed inside the feedback loop of A1 so that its forward voltage drop is divided by the open loop gain of the amplifier thereby yielding a negligible offset area due to the diode. This placement in the feedback loop also eliminates the "ON" resistance of diode D1 as a factor in determining the slew rate of the output of amplifier A1. FET's SW1 and SW2 constitute the "ON/OFF" gate for the peak detector and are driven as a chopper pair. This gate is placed within the feedback loop of A1 rather than preceding the amplifier to minimize the offset drift of the storage capacitor caused by the sum of switch leaking currents. The leakage current of SW1 is 1 to 3 orders of magnitude less than signal diode D1. The 400 pf feedback capacitors are needed to ensure that there will be no overshoot. FET SW3 is used to reset the peak detector. The variable 50 pf capacitors compensate for the offset voltage placed on the storage capacitor by SW2 and SW3 switching off, this compensation being due to their finite gate drain capacitance. As stated, this peak detector circuitry can be implemented in other manners although the present circuitry is considered functionally important due to its use of the wideband, fast-settling operational amplifiers which have an FET input, as well as the placement of diode D1 and other components in the feedback loop of amplifier A1.

The data acquisition circuitry provides a number of advantages which, for the most part, have been identified. In particular, it is capable of recording in real time the amplitude and range of transient targets such as lightning echoes in the presence of background or noise such as precipitation echoes providing, as has been stated, the lightning echoes or other transient echoes initially are greater in amplitude. A further practical value of the circuitry is that it enables the amplitude and range data to be recorded on a relatively simple, inexpensive, moderate speed recorder and, at the same time, it enables the recording of the optical event marker to verify the relationship between the amplitude and range and any particular optical event. The data obtained by the circuitry permits the determination of the radar cross section of cloud-to-ground lightning and its temporal variations during and between strokes. Such measurements also are capable of providing the temporal variation of the electrical density of the lightning channel for much longer times than other means. In addition, it can provide an estimate of channel radius and possibly the conditions conducive to dart leader formations.

In practice, the system as illustrated has been successfully tested both on echoes from stationary targets, such as nearby mountains, and on precipitation echoes using a pulse-like source to simulate lightning to the photodetector. It performed well and reliably in these instances. However, as has been indicated, difficulty was experienced in detecting lightning radar echoes from cloud-to-ground strokes and the reason for this difficulty appears to be the fact that the present radar employed for this system was a 10 centimeter radar. Such a radar was employed because reliance was placed upon previous findings which indicated that a 10 centimeter radar is capable of unambiguously separating precipitation echoes from cloud-to-ground lightning echoes due to the fact that the latter are sufficiently stronger than the former. However, present observations seem to indicate rather conclusively that the peak amplitude of such radar echoes are less than the peak amplitude of precipitation echoes at 10 centimeters. Nevertheless, this unexpected situation easily can be resolved simply by the use of a 50 centimeter radar or radars having considerably longer wavelengths than the 10 centimeter radar presently used. Such radars are readily capable of discriminating against the precipitation echoes with respect to the lightning echoes. Also, as has been indicated, circularly polarized radars at 10 centimeters or cross-polarized radars at 10 centimeters clearly yield good results. Consequently, although the present acquisition system works well under test conditions, its use for detecting cloud-to-ground lightning with radar probably should utilize the 50 centimeter radar or the circularly or cross-polarized radars.

Obviously many modifications and variations of the present invention are possible in the light of the above teachings. It is therefore to be understood that within the scope of the appended claims the invention may be practiced otherwise than as specifically described.

We claim:

1. Data acquisition apparatus for use with radar-type systems having a transmitter driven at a particular pulse repetition rate for producing a series of return signals from targets illuminated by each transmitted pulse, said apparatus providing real-time processing of preselected transient-event targets of a type capable of producing return signals initially greater than other signals in each of said return signal series, comprising:
   resettably-gated peak detector means trackably acquiring the peak value present in each of said return signal series from one transmitter pulse and holding said peak value until the next transmitter pulse, said held value being produced as a peak detector output signal,
   transient event detector means generating an output signal marking the occurrence of each of said preselected transient events,
   sample and hold means triggered by said transient event output signal for producing an output signal representing the range of the transient event and for holding said output signal for a predetermined period of time, and
   peak detector control means coupled to the output of said sample and hold means for gating said peak detector into "ON" and "OFF" modes with the "ON" mode centered about the range of said transient event and having a short duration period relative to said transmitter pulse repetition rate whereupon said peak detector samples each series of return signals only during said "ON" period for providing the amplitude of said transient event signal,
   said hold periods of said peak detector and said sample and hold means facilitating the recording of the transient event amplitude and range.

2. The apparatus of claim 1 further including:
   means for generating a sawtooth waveform output in the form of a series of ramp-like waves each triggered concurrently with the emission of each transmitter pulse and each having a time duration representing the maximum range of return-signal interest whereby successively increasing levels on each ramp represent successively increasing ranges of said return signals.

3. The apparatus of claim 1 further including:
   means coupled to the output of said peak detector for repetitively processing each of said series of return signals for producing an output representing the time of occurrence of said peak value acquired by the peak detector means,
   said sample and hold means being responsively coupled to said time of occurrence output and to said sawtooth waveform output for acquiring and holding a sawtooth signal level representing the range of the peak value present in each series of return signals.

4. The apparatus of claim 3 wherein said means for producing said time of occurrence output is a differential means continuously comparing the input with the output of said peak detector means.

5. The apparatus of claim 3 wherein said sawtooth waveform generating means is provided by a radar A-scope.

6. The apparatus of claim 3 wherein said peak detector control means includes:
   means for comparing said sample and hold output with said sawtooth waveform output,
   multivibrator means coupled to said comparison means for producing an output having a particular time duration period, and
   logic means producing a trigger signal for said peak detector "ON" and "OFF" control gate, said particular time duration period determining the "ON" and "OFF" periods of said peak detector means.

7. The apparatus of claim 3 wherein said resettably-gated peak detector means includes multivibrator-control logic circuitry for resetting the peak detector synchronously with said transmitter pulses and for holding said detector-acquired peak value.

8. The apparatus of claim 3 wherein the gate of said peak detector control means is operatively coupled to said transient event output for causing said control means to be triggered by said transient event output.

9. The apparatus of claim 3 further including:

means for recording said amplitude and range outputs, said recording means having a bandwidth of about 1/pulse repetition frequency of said radar-like transmitter.

10. The apparatus of claim 9 wherein said transient-event detector means includes:
processing means for delaying the generation of a transient event detector output signal derived during one of the transmitter pulse periods until at least the time of emission of a next succeeding transmitter pulse whereby said triggering of said peak detector control gate is delayed a comparable period.

11. The apparatus of claim 10 wherein said preselected targets are optical targets, said transient event detector means including:
photoelectric means for detecting said transient event.

12. The apparatus of claim 11 wherein said transient event detector means includes:
thresholding means for restricting the output of said means to the occurrence of transient events.

13. The apparatus of claim 12 further including:
means for recording said amplitude and range outputs as well as said transient event detector output whereby the derivation of said outputs from a transient event can be verified.

14. The apparatus of claim 12 wherein said recorder means has a bandwidth of about 1 KHz.

* * * * *